United States Patent Office 2,939,850
Patented June 7, 1960

2,939,850
PROCESS FOR RECLAIMING SCRAP RUBBER WITH POLYMER OIL-SULFUR MIXTURE AND COMPOSITION THEREOF

Robert E. Clayton, Roselle Park, N.J., assignor to Esso Research and Engineering Company, a corporation of Delaware No Drawing. Filed June 12, 1956, Ser. No. 590,831

3 Claims. (Cl. 260—2.3)

The present invention relates to reclaiming rubbery materials. More particularly it relates to an improved method for reclaiming rubber and rubbery compositions formed thereby. Specifically, it concerns treating scrap rubber with a polymer reclaiming agent.

In the process for reclaiming rubber, scrap rubber is comminuted and treated with a reclaiming agent which helps soften the rubber during the deploymerization step. The quality of the reclaiming agent is important because it must penetrate to the center of the rubber particle without excessively solvating the surface of the rubber. The softening, swelling and penetrating actions of the agent must be such that a uniform plasticity results.

Various petroleum and cold tar naphthas have been tried as reclaiming aids, but they usually have too much solvent action and not enough penetration. This causes the particles to be excessively soft on the surface and hard on the inside, and results in an unacceptable product having hard granules in an excessively soft, sticky matrix.

It has now been discovered that clay treated polymer is an excellent reclaiming aid. It has been found to be superior to other reclaiming aids in softening and penetrating power as well as other properties, such as odor. Good odor is an important rubber characteristic where the rubber is used in such items as footwear.

Furthermore, it has been discovered that compounding clay treated polymer with sulfur produces a reclaiming agent which has softening properties superior to clay treated polymer alone.

Additional advantages obtained by the use of clay treated polymer, either alone or in combination with sulfur, will become evident in the course of the subsequent description of the invention.

The clay treated polymer oil may be prepared in a clay treating unit which consists of a furnace having two individual circuits, one of which is used to preheat the feed and the other to supply heat to the fractionating tower which separates the polymer from light and heavy naphtha, and a drum charged with about 20 tons of 8 to 15 mesh Attapulgus clay. The highly olefinic feed stream consists of a mixture of depentanized distillate from an isoprene fractionator unit and debutanized bottoms from a stream cracking unit. It boils between about 50 to 500° F. and contains about 10 to 25% conjugated diolefins, 40 to 60% olefins, 20 to 40% aromatics, and 2 to 5% paraffins. The liquid feed stream is generally preheated to about 250 to 300° F. and passed downwardly through the clay drum. A temperature rise of about 30 to 50° F. occurs in the clay bed as a result of the exothermic reaction. The treated distillate leaving the clay drum is transferred to a fractionating tower which separates the clay treated polymer from light and heavy naphtha. A stripper in the bottom of the tower removes any lighter hydyrocarbons that may be mixed with the polymer.

The clay treated polymer oil generally has a Staudinger molecular weight between about 200 and 1000 and a Wijs iodine number between about 250 and 320, preferably about 260. It should have about 82 to 95% by weight non-volatile matter (ASTM-D-154-43) and an ash of about 0.3 to 0.4 wt. percent. The polymer's viscosity at 210° F. is usually about 90 to 220 seconds, and preferably about 156 seconds, in a Saybolt Universal viscometer. Its maleic anhydride and Gardner diene numbers are about 109 and 19, respectively. It boils between about 400° and 1000° F., having 5% and 95% points at about 500° and 910° F., respectively. The flash point should be between about 190° and 300° F. Its API at 60° F. is between about 6 and 14 degrees.

The clay treated polymer-sulfur mixture is prepared by stirring about 1 to 25 parts by weight, preferably 10 to 20 parts, of sulfur with 100 parts by weight of polymer oil until the two components are well blended. It is especially preferred that about 15 parts by weight of sulfur per 100 parts by weight of polymer be employed.

In the practice of the present invention, scrap rubber is comminuted on a cracker mill and the particles that are small enough to pass through a 4 to 30 mesh screen are carried forward to the next step, while the coarser particles are recycled for further subdivision. The fine particles are passed over a magnet to remove any ferrous materials that may be in the scrap before they are treated with a reclaiming agent and softenend in a digester, pan or mechanical process. The comminuted rubber may be defabricated with acid and neutralized with caustic.

In the digester process, the treated scrap is charged into a steam-jacketed autoclave equipped with an agitator. Generally, the rubber is maintained at a temperature between about 370° and 410° F., under about 100 to 250 p.s.i. pressure for about 8 to 24 hours. Upon removal from the digester, the scrap is washed with water to remove any decomposed fabric and dried.

In the pan process, comminuted defiberized scrap is mixed with a reclaiming agent and placed in open pans which are then stacked in a pressure vessel and heated with live steam. Generally, about 150 p.s.i. steam pressure, which corresponds to about 365° F., is used for about 15 hours. After the heat treatment, the softened scrap is dried to remove water.

In the mechanical type processes, scrap is treated with reclaiming agent and heated dynamically by means of modified mixing or extruding machines.

The softened scrap is blended on a mill or in an internal mixer, such as a Banbury mixer and subjected to preliminary refining on a mill having a high friction ratio. The rolls on the mill are set very close together forcing the rubber mass into a thin sheet. Following this preliminary refining, the material is usually in the form of a loosely rolled sheet having a thickness of about 0.015 inch. The sheet is then passed through a strainer to remove non-magnetic metals and other foreign matter and given a finished refining. Here the stock is passed through one or more refiners and results in a sheet of reclaimed rubber about 0.003 to 0.007 inch thick. The sheets are wound on a revolving drum until a cylinder having thickness of about 1 inch is formed. It is then cut lengthwise to form a slab and dusted to prevent it from sticking to other slabs.

The clay treated polymer, either alone or in combination with sulfur, may be used as a reclaiming aid for natural or synthetic rubbers and mixtures thereof. It is especially effective in reclaiming highly unsaturated rubbers, such as natural or GR–S rubber and mixtures thereof. It may be used, if desired, in reclaiming nitrile, polychloroprene, and Butyl rubbers. Butyl rubber is described in U.S. Patent 2,356,128.

The following examples are given to illustrate the advantages of the present invention over the prior art, but it is understood that the invention is not limited thereto. All recipes and formulas are in parts by weight.

EXAMPLE 1

Smoked sheets of natural rubber were compounded according to the following recipe:

Ingredient:
- Rubber _____ 100
- Carbon Black MPC _____ 50
- Heavy pine tar _____ 3
- Zinc oxide _____ 5
- Stearic acid _____ 3
- Phenol-beta-naphthylamine _____ 1
- 2-mercaptobenzothiazol _____ 1
- Sulfur _____ 2.7

The compounded rubber was press cured at 287° F. for various periods of time to determine optimum cure. The following data were obtained:

Table I

| Cure Time, Minutes | 30 | 45 | 60 |
|---|---|---|---|
| Tensile Strength, p.s.i. | 4,275 | 4,225 | 4,200 |
| Elongation, percent | 630 | 605 | 575 |
| Modulus at 200% Elong., p.s.i. | 900 | 975 | 975 |
| Hardness, Shore A | 63 | 68 | 68 |

The optimum cure was found to be 45 minutes at 287° F.

EXAMPLE 2

Natural rubber, compounded according to the recipe in Example 1, was cured for 45 minutes at 287° F. and comminuted to pass through a 16-mesh screen. Samples of this rubber were mixed with heavy pine tar, dipentene, clay treated polymer or mixtures thereof. In each case the rubber sample was treated with the reclaiming aid for about 5 minutes at room temperature, softened for 15 hours under 150 p.s.i.g. of open steam and dried. Each sample was then coalesced by passing it 3 times through a laboratory compounding mill with a 0.015 inch opening between its rollers. Next, it was refined by passing it 10 times through a laboratory compounding mill having a 0.007 inch opening between its rollers. The temperature during the coalescing and refining operations was maintained at about 120° F.

Changes in plasticity were measured with a Mooney viscometer, according to ASTM D 927–49T. This instrument measures the torque required to revolve a rotor at constant speed in a sample of polymer at constant temperature. The following readings were taken after 4 minutes at 212° F.

Table II.—Effect of various reclaiming agents

| | A | B | C | D |
|---|---|---|---|---|
| Scrap Rubber | 100 | 100 | 100 | 100 |
| Heavy pine tar | 3 | | | 3 |
| Dipentene | 4 | | 4 | |
| Clay treated polymer | | 7 | 3 | 4 |
| Mooney Viscosity | 123 | 102 | 110 | 117 |

The viscosity data show that clay treated polymer when used alone softens rubber to a greater degree than pine tar and dipentene, or mixtures of these agents with clay treated polymer. Furthermore, samples B, C and D, which were treated with clay treated polymer oil, had a smoother appearance than the control (sample A), which means these samples were less nervy. These observations are in agreement with the Mooney data.

EXAMPLE 3

Natural rubber, compounded according to the recipe in Example 1, was cured for 45 minutes at 287° F., and ground to pass through a 16-mesh screen. Samples were mixed for 5 minutes at room temperature with either a mixture of heavy pine tar and dipentene or clay treated polymer and sulfur (15 parts by weight sulfur/ 100 parts by weight clay treated polymer). The samples were softened and milled according to the procedure outlined in Example 2 and evaluated with a Mooney viscometer.

Table III.—Effect of clay treated polymer+sulfur on reclaimed rubber

| | E | F |
|---|---|---|
| Scrap Rubber | 100 | 100 |
| Heavy Pine Tar | 3 | |
| Dipentene | 4 | |
| Clay treated polymer+sulfur | | 7 |
| Mooney Viscosity | 123 | 92 |

The Mooney viscosity data show that stock treated with the clay treated polymer-sulfur mixture is 25% softer than the control (sample E). Furthermore, sample F had a much smoother appearance.

It is not known whether or not the sulfur combines with the clay treated polymer when the two components are mixed at room temperature, but it is believed they combine during the softening step.

EXAMPLE 4

Reclaimed rubber samples E and F (Example 3) were compounded according to the following recipe and press-cured at 287° F. for various periods of time.

Table IV

| Ingredient | E | F |
|---|---|---|
| Reclaimed Rubber | 180 | 180 |
| Zinc Oxide | 5 | 5 |
| Stearic Acid | 2 | 2 |
| 2-mercaptobenzothiazole | 0.5 | 0.5 |
| Diphenylguanidine | 0.2 | 0.2 |
| Sulfur | 3 | 3 |

The vulcanizates were then physically evaluated.

Table V

| | E | | | F | | |
|---|---|---|---|---|---|---|
| Curing Time, Min. | 20 | 30 | 40 | 20 | 30 | 40 |
| Tensile Strength, p.s.i. | 1,200 | 1,235 | 1,200 | 1,060 | 1,020 | 1,020 |
| Elongation percent | 255 | 215 | 210 | 200 | 200 | 200 |
| Modulus at 200% Elong., p.s.i. | 1,085 | 1,085 | 1,065 | 1,060 | 1,020 | 1,020 |
| Hardness, Shore A | 63 | 63 | 63 | 61 | 61 | 61 |

These results show that sample F, which was treated with a mixture of clay treated polymer and sulfur, cured at a faster rate than the control.

Samples A, B, C and D (Examples 1 and 2) were compounded and vulcanized in the same manner as above. The vulcanizates of samples B, C and D were comparable to that obtained with sample A.

In accordance with the present invention, 1 to 20 parts by weight of clay treated polymer or clay treated polymer combined with sulfur are blended with 100 parts by weight of natural rubber or synthetic rubber, such as GR–S rubber, at approximately room temperature. A preferred embodiment of this invention is where 5 to 10 parts by weight of the polymer with or without sulfur are mixed with 100 parts by weight of rubber. It is especially desirable to use about 7 parts by weight of the polymer, either alone or in combination with sulfur, per 100 parts by weight of rubber.

In summary, therefore, it has been found that clay treated polymer, whether used alone or in combination with sulfur, imparts a greater softness to scrap rubber than other agents used in the prior art. Furthermore, compounding and vulcanizing rubber reclaimed with clay treated polymer and sulfur mixtures indicate that this combination brings about a faster cure and therefore is more desirable. Other variations and modifications such as employing cures other than the press type, may be employed in the present invention without departing from the spirit of the invention or the scope of the appended claims.

What is claimed is:

1. A composition comprising 100 parts by weight of a vulcanized rubber which is softened to the center in the presence of heat with about 1 to 20 parts by weight based upon rubber of an oily mixture containing 1 to 25 parts of sulfur with 100 parts of a hydrocarbon polymer oil prepared by providing a highly olefinic feed from a mixture of depentanized distillate and debutanized bottoms containing about 10 to 25% conjugated diolefins, 40 to 60% olefins, 20 to 40% aromatics, and 2 to 5% paraffins, boiling between 50° and 500° F.; preheating said olefinic feed to 250° to 350° F.; passing said preheated feed through a clay treating zone; and separating by distillation from said treated feed said polymer oil which has a boiling range between about 400° and 1000° F., a Wijs iodine number between about 250 and 320, an API gravity of 6 to 14 degrees, a molecular weight between about 200 and 1000, a viscosity of 90 to 220 seconds at 210° F., and a flash point of 190° to 300° F.

2. In a process for reclaiming rubber wherein comminuted rubber is softened to the center; the improvement which comprises the steps of mixing 100 parts by weight of comminuted rubber with about 1 to 20 parts by weight based upon rubber of an oily mixture containing 1 to 25 parts of sulfur with 100 parts of a hydrocarbon polymer oil prepared by providing a highly olefinic feed from a mixture of depentanized distillate and debutanized bottoms containing about 10 to 25% conjugated diolefins, 40 to 60% olefins, 20 to 40% aromatics, and 2 to 5% paraffins boiling between 50° and 500° F.; preheating said olefinic feed to 250° to 350° F.; passing said preheated feed through a clay treating zone; and separating by distillation from said treated feed said polymer oil which has a boiling range between about 400° and 1000° F., a Wijs iodine number between about 250 and 320, a molecular weight of about 200 to 1000, a viscosity of 90 to 220 seconds at 210° F., a flash point of 190 to 300° F., an API gravity of 6 to 14 degrees; and subsequently softening the mixture in the presence of heat.

3. A process for reclaiming rubber which comprises comminuting vulcanized rubber; defabricating the rubber with acid and neutralizing it with caustic; mixing 100 parts by weight of the rubber with about 1 to 20 parts by weight based upon rubber of an oily mixture containing 1 to 25 parts of sulfur with 100 parts of a hydrocarbon polymer oil prepared by providing a highly olefinic feed from a mixture of depentanized distillate and debutanized bottoms containing about 10 to 25% conjugated diolefins, 40 to 60% olefins, 20 to 40% aromatics, and 2 to 5% paraffins boiling between 50° and 500° F.; preheating said olefinic feed to 250° to 350° F.; passing said preheated feed through a clay treating zone; and separating by distillation from said treated feed said polymer which has a boiling range between 400° and 1000° F., a Wijs iodine number of about 250 to 320, a molecular weight of about 200 to 1000, a viscosity of 90 to 220 seconds at 210° F., a flash point of 190° to 300° F., and an API gravity of 6 to 14 degrees; softening the rubber to the center in the presence of pressured steam; and milling the softened rubber into thin sheets.

References Cited in the file of this patent

UNITED STATES PATENTS

| | | |
|---|---|---|
| 2,217,918 | Rostler et al. | Oct. 15, 1940 |
| 2,545,828 | Randall | Mar. 20, 1951 |